E. BECKER.
SCREW CUTTING MACHINE.
APPLICATION FILED FEB. 25, 1920.

1,371,544.

Patented Mar. 15, 1921.
6 SHEETS—SHEET 1.

Right Screws

Left Screw

Witness
Edwin L. Bradford

Inventor
Edmund Becker
By Ritter & Ritter
his Attorneys

E. BECKER.
SCREW CUTTING MACHINE.
APPLICATION FILED FEB. 25, 1920.
1,371,544.
Patented Mar. 15, 1921.
6 SHEETS—SHEET 2.
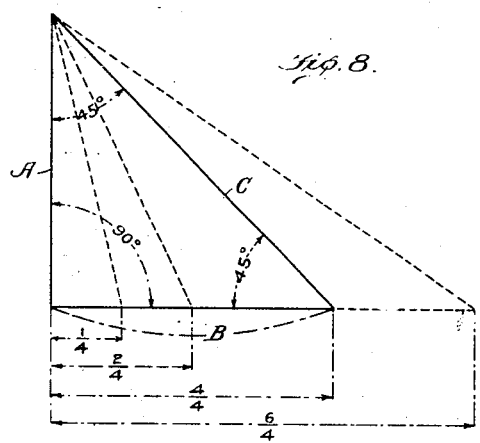
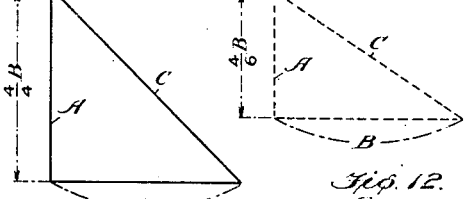
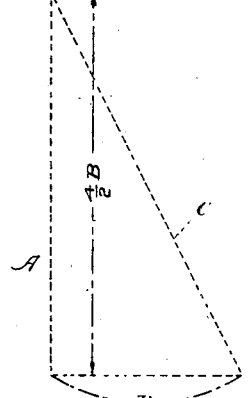
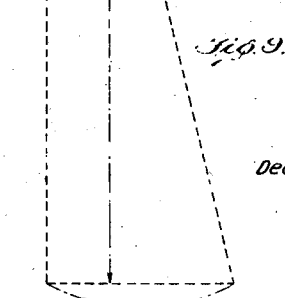
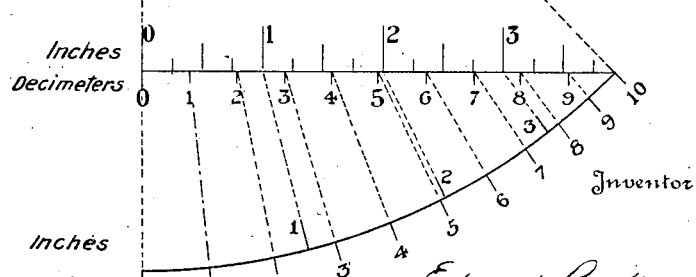
Witness
Edwin L. Bradford
Inventor
Edmund Becker
By
his Attorneys E. BECKER.
SCREW CUTTING MACHINE.
APPLICATION FILED FEB. 25, 1920.
1,371,544.
Patented Mar. 15, 1921.
6 SHEETS—SHEET 3.
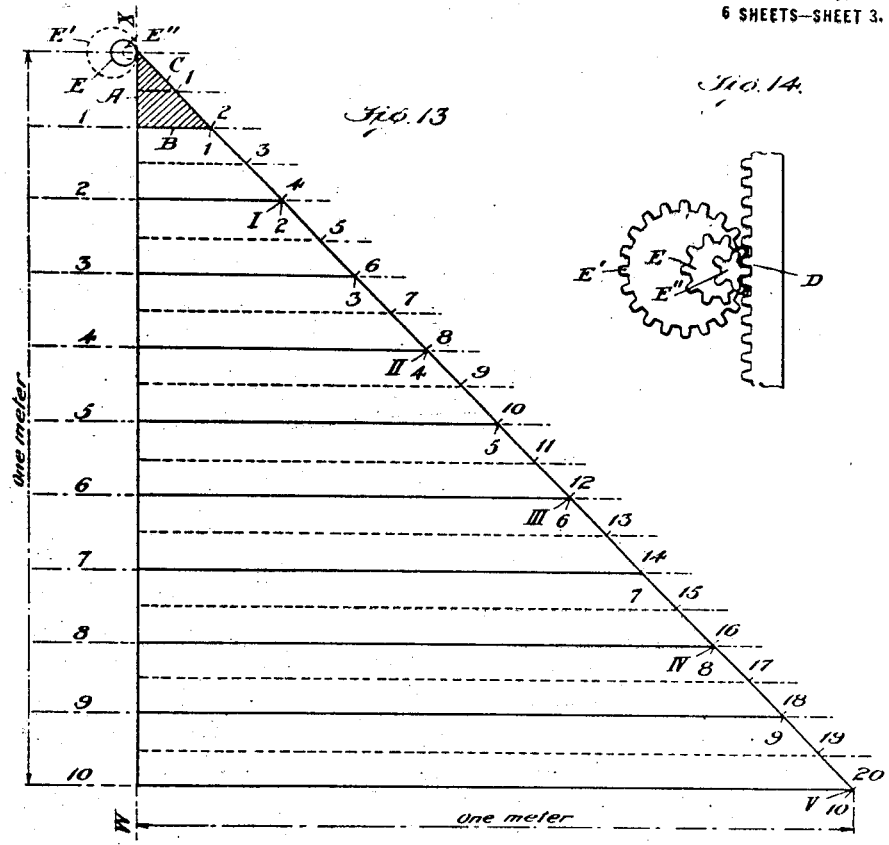
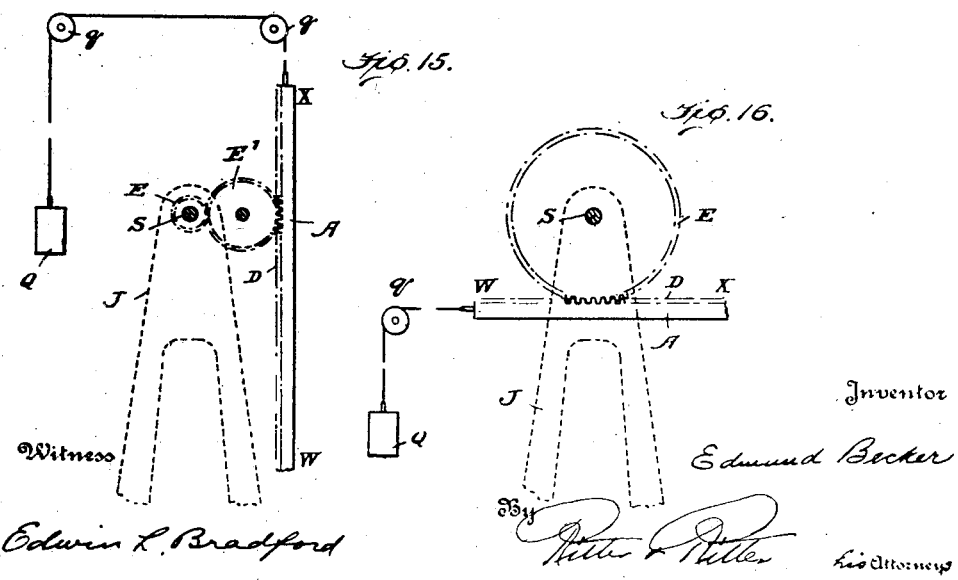

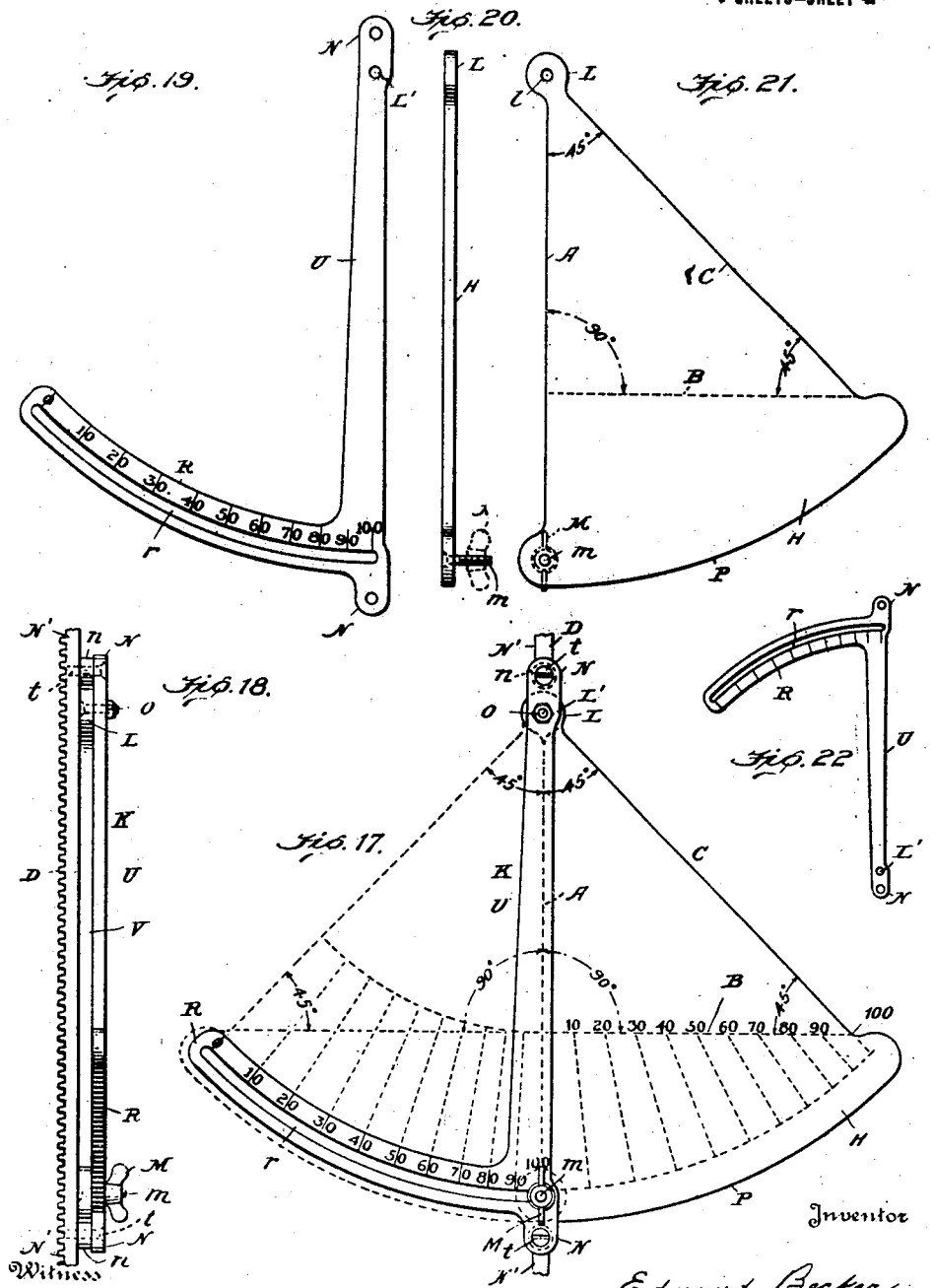

E. BECKER.
SCREW CUTTING MACHINE.
APPLICATION FILED FEB. 25, 1920.
1,371,544.
Patented Mar. 15, 1921.
6 SHEETS—SHEET 5.
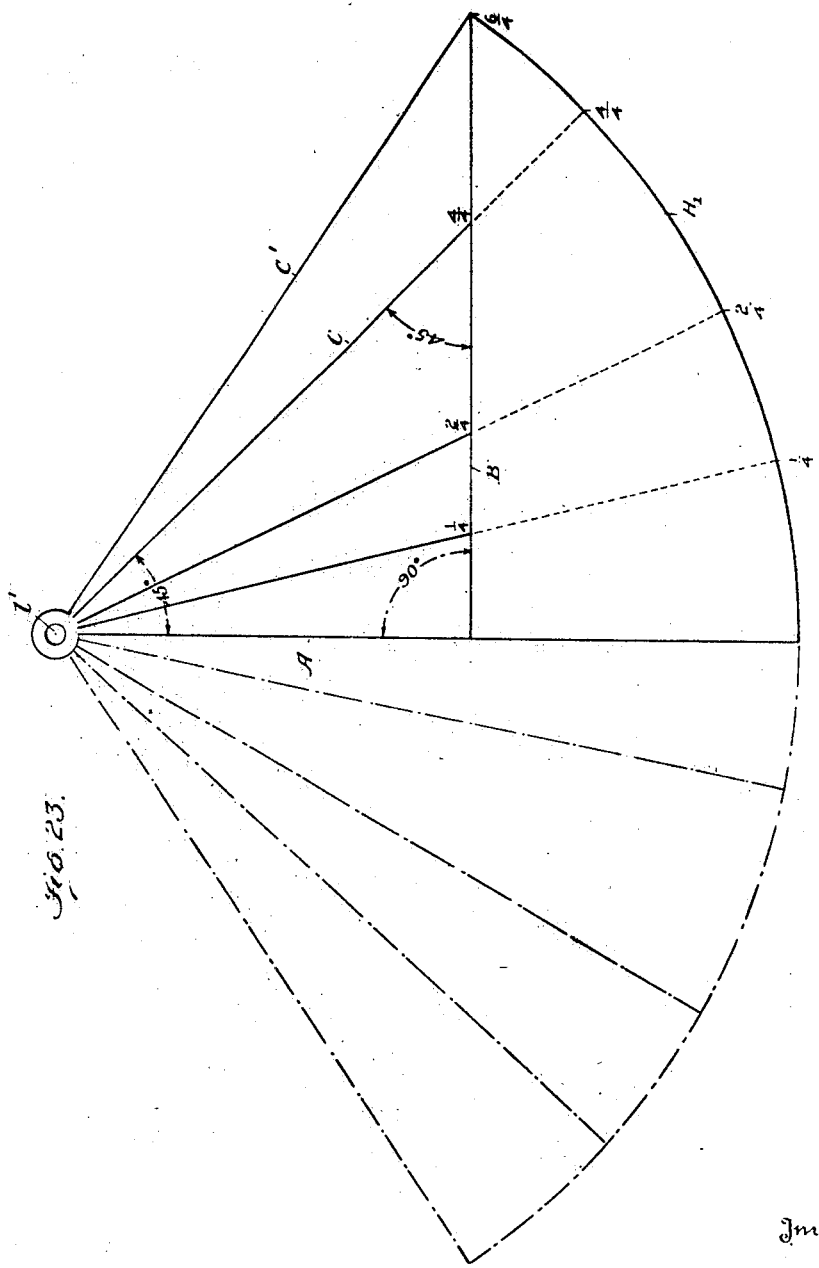

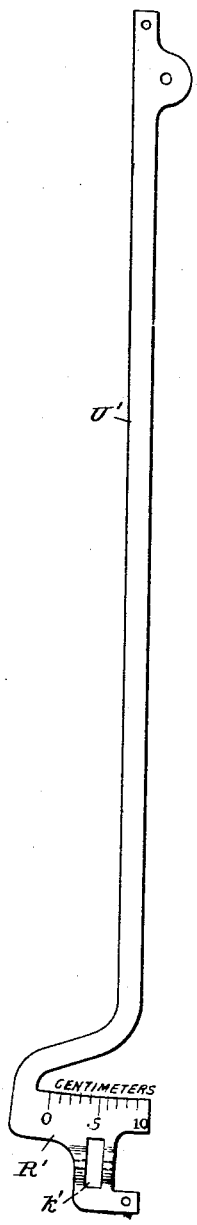
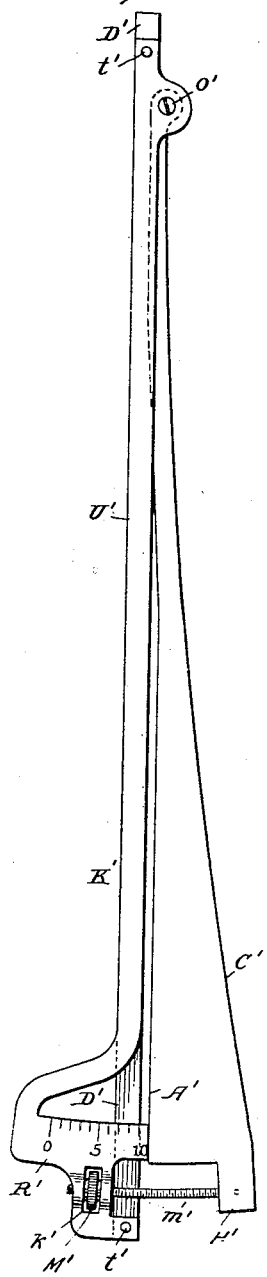
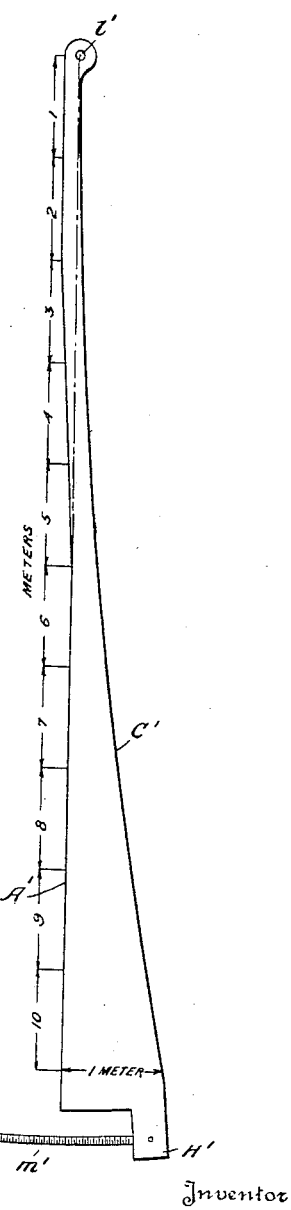

UNITED STATES PATENT OFFICE.

EDMUND BECKER, OF WASHINGTON, DISTRICT OF COLUMBIA.

SCREW-CUTTING MACHINE.

1,371,544.  Specification of Letters Patent.  Patented Mar. 15, 1921.

Application filed February 25, 1920. Serial No. 361,164.

*To all whom it may concern:*

Be it known that I, EDMUND BECKER, a citizen of the United States, residing at Washington, in the District of Columbia, have invented certain new and useful Improvements in Screw-Cutting Machines; and I do hereby declare the following to be a full, clear, and exact description of the invention, such as will enable others skilled in the art to which it appertains to make and use the same.

My invention relates to a lathe or similar machinery for cutting or tracing screw threads of a determined pitch, and the principal object thereof is to provide means for obtaining in a simpler manner and more accurately than has heretofore been possible threads of bolts or screws of any uniform or varying pitch and in metric or English or any other standard measure.

The screw may be broadly defined as an inclined plane wrapped around a cylinder in such a way that the height of the plane is parallel to the axis of the cylinder. All machinery for cutting screw threads must, therefore, effect the mechanical solution of the problem of tracing the incline of the plane upon the blank from which the screw is produced. The machinery must mechanically reproduce the base of the inclined plane, its height and their resultant, its length or slope, for each is in intimate relation with the two others and the determination of two of these factors establishes the third.

In the usual screw cutting lathe these three elements of the inclined plane are resolved in the following manner: Each revolution of the live spindle or main shaft by which the screw blank is revolved produces the base of the triangle or inclined plane corresponding to the circumference of the blank, and, by means of the proper gear, causes the simultaneous displacement of the tool carrier parallel to the axis of the blank to an extent equal to the height of the plane, such displacement being equal to the pitch of the screw. The length of the screw or helix, which corresponds to the hypotenuse or inclined side of the plane, varies for a given pitch in accordance with the diameter of the screw produced. In a lathe of this character the movement of the carrier enabling the tool to trace the helix upon the screw blank is effected by means of trains of gears, which are complicated and necessarily restricted in number.

In my invention I dispense with the leading screw which moves the tool carrier by means of the trains of gears and replace its action by effecting the sliding of the tool carrier along the slopes or hypotenuses of inclined planes whose relations, it will be appreciated, are capable of infinite and accurate variation and whose slopes when curved instead of straight are enabled to generate screws of progressively increasing or decreasing twist or pitch that are sometimes termed differential screws. I am aware that heretofore it has been proposed to control the pitch determining displacement of the cutting tool by the use of an inclined plane governing and directing the movement of the tool carrier; but, so far as I am aware, prior mechanisms proposing to employ an incline for controlling the displacement of the tool have failed of practical realization by not adhering to the fundamentals of the inclined plane, neglecting to preserve the height of the incline in perpendicular relation to the base and an aliquot part of it, thereby rendering the slope or incline indefinite and consequently requiring a series of measurements and computations to be made in order to determine the displacement of the tool carrier and the cutting tool carried thereby. Besides the loss of time involved in adjusting it for operation, such a mechanism is objectionable in that it is subject to errors of calculation. By my invention a mechanism is supplied directly furnishing the desired pitch of the screw by simple mechanical adjustments. A further novel feature of my invention consists in coördinating the revolutions of the live spindle to the displacement of the inclined plane in such manner that each rotation of the spindle effects, in terms of the standard unit of measure adopted, a displacement of the inclined plane which is a multiple or sub-multiple and aliquot part of its base, which latter also is functionally a multiple or sub-multiple of said unit. By this means, as will hereinafter appear, the setting or adjustment of the mechanism to cut threads of any desired pitch is greatly simplified. A still further novel feature of my invention consists in providing the inclined plane device of the mechanism with graduations indicating and corresponding to aliquot subdivisions of the fundamental inclined plane, such graduations preferably being arranged on a circular arc comprehended between the slope of the generic inclined plane and its extended base and the successive graduations being at progressively varying distances from each other instead of equidistant.

The broad principles of my invention, as well as an illustrative embodiment of those principles, will now be explained by reference to the accompanying diagrams and drawings of mechanical parts.

Figure 6:
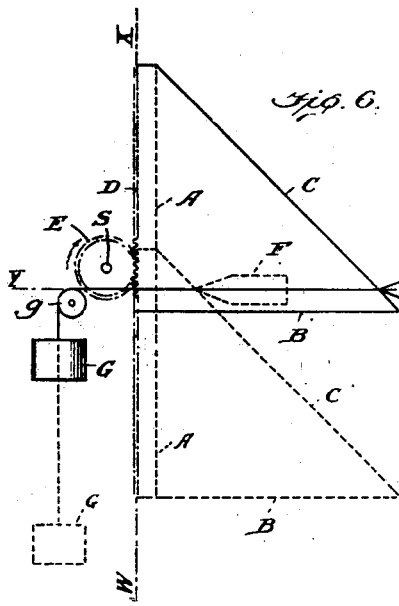

Fig. 6 shows diagrammatically a weight-operated tool carrier sliding down the slope of an inclined plane driven from the live spindle of the lathe, the inclined plane and the tool carrier being turned at right angles to normal position in order to disclose in a single diagram the manner in which the movements of the tool carrier are controlled by the lathe spindle through the inclined plane driven thereby.

Figure 7:
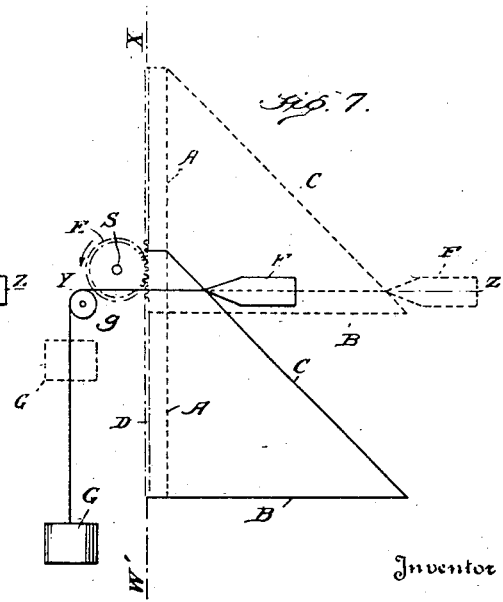

Fig. 7 corresponds to Fig. 6, but illustrates a movement of the inclined plane in the opposite direction causing the tool carrier to travel up the slope of the plane.

Fig. 8 illustrates in full lines the basic inclined plane with sides at right angles to each other and of equal length, and shows in dotted lines the slopes of various right-angle triangles whose heights are aliquot parts or multiples of aliquot parts of the base of the fundamental inclined plane.

Figs. 9, 10, 11 and 12 respectively and separately show the corresponding planes of Fig. 8 in inverted ratios.

Fig. 13 is a diagrammatic illustration of the inclined plane driven by the live spindle of the lathe, the base of the plane being represented as equal to one meter in length and being subdivided into decimeters.

Fig. 14 is a detail view illustrating the means for driving the inclined plane shown in Fig. 13.

Figs. 15 and 16 show in a lathe the pinion on the live spindle driving the inclined plane which, in Fig. 15, is movable vertically and in Fig. 16 horizontally.

Figs. 17 to 22, inclusive, illustrate my invention as embodied in an inclined plane device for application to the front of a lathe; Fig. 17 being a view of the inclined plane device as assembled for use, various positions of adjustment of the swinging sector thereof being indicated by dotted lines; Fig. 18 being a detail view perpendicular to Fig. 17 illustrating the parts shown in that figure; Fig. 19 being a detail view of the scale bearing portion of the frame member of the device, and Figs. 20 and 21 being detail views of the swinging sector member by which the operative height of the inclined plane is varied.

Fig. 22 is a view corresponding to Fig. 19, but illustrating the arcuate limb reversed to receive a reversed sector member in order to change the direction of the helix and produce screws of a twist contrary to that produced by the inclined plane device shown in Figs. 17 to 22.

Fig. 23 shows the several inclined planes of Fig. 8 grouped on a swinging sector.

Fig. 24 shows diagrammatically in juxtaposed relation metric and inch graduations as applied to subdivisions of the base of the fundamental inclined plane and as they are arranged for application to the arcuate member of the inclined plane device illustrated in Figs. 17 to 22, inclusive of the drawings.

Fig. 25 is a view in elevation of a modified form of the inclined plane device.

Fig. 26 is a detail view of the scale member embodied in the construction illustrated in Fig. 25.

Fig. 27 is a detail view of the pivoted sector member which coöperates with the scale member shown in Fig. 26.

Figure 1:
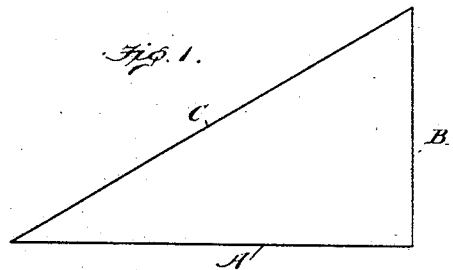
Figure 1 shows an inclined plane having its height and base at right angles, its hypotenuse representing the length of the helix corresponding to the ratio of the height to the base.

From Fig. 1 of the drawings it will be understood that if the inclined plane or triangle shown therein is wrapped around a cylinder of circumference equal to the side A in such way that the height B of the plane remains parallel to the axis of the cylinder, the slope or hypotenuse C of the inclined plane will generate a helix of one complete turn whose diameter is that of the cylinder and whose height equals the height B of the inclined plane.

Figures 2, 3, 4:
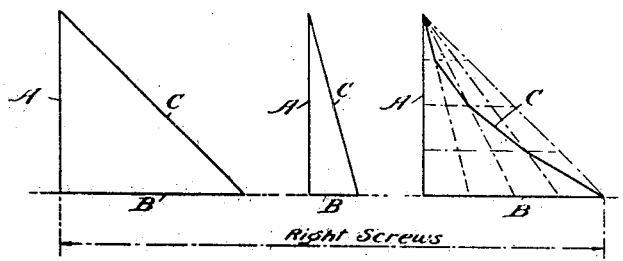
Figs. 2, 3, 4 and 5 are diagrams of divers inclined planes for right-hand and left-hand screws.
Figure 5:
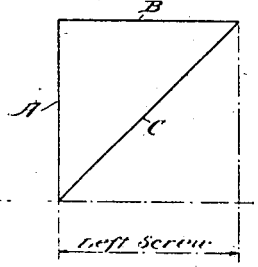

It will also readily be understood that if the cutting tool of the lathe is caused to trace the slope C of the inclined plane as the latter is wrapped around the cylinder in the manner described, then such tool will trace or cut upon the cylinder a helix of corresponding character. In a right triangle in which the side A is the basic distance and the side B the height of the incline, the length of the slope of the side C is the resultant of the ratio $\frac{A}{B}$, and as this ratio of the base to the height is limitless, it will be perceived that by its variation an unlimited variety of screws may be produced. Each of the four inclined planes illustrated in Figs. 2, 3, 4 and 5 has its base A equal to the rectification or developed length of the circumference of the cylinder around which the screw involutes and, when wrapped on the cylinder each generates by its slope C one turn of a screw or helix. The height B in Figs. 2, 4 and 5 is equal to the base A and the several screws of these inclined planes therefore have a pitch of one (1), that is, one to the inch or one to the decimeter, depending upon the unit chosen), while in Fig. 3 the height B, being one fourth (¼) of A, the pitch would be four (4) to the inch or two and one half (2½) centimeters if the decimeter be the unit chosen. It will therefore be seen that the pitch is independent of the diameter of the screw, being simply the lead or distance which the screw advanced in one turn. Right-hand screws would be generated by the inclined planes of Figs. 2, 3 and 4, while in Fig. 5 the plane is reversed and the slope C thereof thereby generates a left-hand screw. In Fig. 4 the slope C is parabolic and generates a screw of decreasing twist, sometimes called a differential screw; it discloses the relation between the linear velocity of the lead and the varying angles of inclination of the helical line.

In the diagrammatic illustrations of my invention shown in Figs. 6 and 7, the inclined plane is actuated by a pinion E on the live spindle S of the lathe.

The inclined plane of a forty-five degree right triangle which, therefore, has its opposite sides and angles equal, has been chosen as the basic plane of the system in applying the principle of my invention. Fig. 8 shows such a plane A B C in conjunction with which has been illustrated in dotted lines three other inclined planes of the same base but having heights which are ¼, ½ and 1½ times B. When the generic 45 degree plane A B C slides along its base A, as shown in Figs. 6 and 7, for a distance equal to the side A, it effects a linear displacement of the tool carrier F equal to the height B of the inclined plane and produces one turn of a screw of unity pitch. Screws of one turn, of one-fourth, one-half and one and one-half of the same unity pitch will result when the plane A B C is replaced by the other planes indicated in Fig. 8, since the pitch in each case is the ratio of the height of the corresponding plane to the length of its base. If, as shown to a smaller scale in Figs. 9, 10, 11 and 12, it is desired to produce the helices of height B by the use of the planes of Fig. 8, their base A will have to be lengthened four times in the case of the plane corresponding to Fig. 9, twice in the case of that corresponding to Fig. 10, and will have to be shortened ⅓ in the case of the plane corresponding to Fig. 12, thus respectively giving screws of four turns of ¼ pitch, two turns of ½ pitch and two thirds turn of 1½ pitch, and hence to obtain an equal linear displacement of the tool carrier F in the cases of the several inclined planes shown in Fig. 8, the bases thereof, and consequently all their other sides, must be multiplied by the respective inverted ratios of their heights to the generic base A.

Instead of employing the exaggerated lengths of incline suggested by Figs. 9, 10 and 12, the same plane can be used to produce its multiples and sub-multiples, as will now be explained. Fig. 13 shows the fundamental plane A B C having sides A and B which are each one decimeter in length; it is (see detail Fig. 14) driven by a pinion E of ten teeth having a circumferential pitch which is also one decimeter long. The pinion gears on a rack D (see Figs. 6, 7 and 14) secured to the inclined plane and likewise having ten teeth for each decimeter of length. By this arrangement the tool carrier F, which, as shown in Figs. 6 and 7, is caused by the weight G to follow the slope C of the inclined plane as the latter is moved by the coöperation of the rack D and the pinion E mounted upon the live spindle S of the lathe, is made to have a displacement of ten centimeters for each turn of the pinion, that is, each turn of the pinion produces a screw one decimeter long and of one decimeter pitch. The tool carrier F is connected to its actuating weight G by a cable passing around a suitable pulley $g$ mounted on the frame of the lathe. When, as shown in Fig. 13, the plane A B C has been enlarged ten times it becomes one meter long at its base and one meter in height, and in response to ten revolutions of the live spindle S will produce a screw one meter long having ten turns of one decimeter pitch, as indicated in Fig. 13 by the numerals 1 to 10, inclusive, marking the intersections of the horizontal full lines with the hypotenuse of the inclined plane. If the ten-tooth pinion E is replaced by the five-tooth pinion E″ (see Fig. 14) the motion of the rack D and of the inclined plane in the direction of its base A is reduced one half, so that, instead of ten revolutions, the live spindle S and pinion E″ will be required to make twenty revolutions to advance the inclined plane one meter, the advance of the tool carrier being correspondingly reduced by one half also, the result being a screw one meter long with twenty turns of five centimeters pitch, as indicated by the numerals 1 to 20 along the slope of the enlarged inclined plane. Likewise if the ten-tooth pinion E is replaced by a twenty-tooth pinion E′ only five revolutions of the live spindle S of the lathe will be required to shift the inclined plane a distance of one meter, that is to say, the displacement of the inclined plane and of the tool carrier is doubled for each revolution of the live spindle S and a screw one meter long with five turns of two decimeters pitch, as indicated by the Roman numerals, is the result. It will thus be seen that by changing the driving gear of the plane, that is, the pinion E, the same plane can, without enlargement, be used to produce its multiples and sub-multiples. The explanation of the character of driving gear for the plane has been made with reference to the metric system, but its application to the English system of measurement will be apparent. When a single driving pinion is employed and its perimeter on its pitch line and the base A of the plane are equal in length and the measure a certain chosen unit of length, such as the meter or the yard or their sub-multiples, the tool carrier F advances according to the ratio of the height B to the base A of the inclined plane, and this advance for each turn of the live spindle S of the lathe is called the true pitch of the screw. The use of a single driving pinion for actuating the incline which controls the movement of the tool carrier F on the slide Y Z perpendicular to the slides W X and W' X' guiding the respective inclined planes is shown in Figs. 6 and 7; but as illustrated in Fig. 15, (see E, E'), a train of gears maintaining the same ratio of movement of the inclined plane may be employed in lieu of a single pinion. To simplify the drawings the slides W X and W' X' of the inclined plane or rack member and also the slides Y Z of the tool carrier have been illustrated in Figs. 6, 7, 15 and 16 by dotted lines only, suitable means for guiding such parts being well known to those skilled in the art of constructing lathes; and for a similar reason the arrangement of pinions for driving the inclined plane has not been illustrated in detail. If desired the guides W X; W' X' and Y Z, as well as the gearing mechanism for changing the relative speeds of the live spindle S and the rack D, may be of the character disclosed in either British patent to Johnson, No. 3387 of 1868, or United States Patent No. 510,329, granted to J. Davidsohn on December 5, 1893, it being of course understood that the pinions of the gearing shall be of proper character for use in the mechanism embodying my invention.

Figs. 15 and 16 illustrate a construction in which the rack D and attached inclined plane are counterbalanced by a weight Q through the intervention of a cable passing around a suitable pulley or pulleys $q$ journaled upon the frame of the lathe. In Fig. 16, where the rack bar D and attached inclined plane are illustrated as horizontally movable, the weight Q is not required to counterbalance the weight of these parts, as is the case in Fig. 15 where the rack bar and inclined plane move vertically, but need only be sufficient to counterbalance or substantially counterbalance the friction of the inclined plane in its slide guide. Counterbalancing the weight of the inclined plane device and overcoming the friction thereof in its slide guide minimizes the pressure of the driving pinion on the rack and simplifies the regulation of the latter, thereby permitting a more delicate and accurate linear fixation of the rack and the gear of the live spindle S of the lathe J.

The preferred form of slidable inclined plane device which I employ to carry out the principle of my invention is, as shown in Figs. 17 to 21, inclusive, comprised of two principal parts which are pivotally connected at a point corresponding to the intersection of the base and slope of the generic inclined plane, means being provided for securing these two parts in any desired position of adjustment. These two pivotally connected parts may be described generally as a sector member H and a frame K. The base A and slope C of the sector H make an angle of 45 degrees with each other, and the triangle completed by erecting the line B perpendicular to the side A is the generic 45 degree right triangle, the base A and height B thereof being (assuming the metric system to be used) one meter. At the intersection of the base A and slope C the sector section is somewhat enlarged, as shown at L, to allow a pivot bolt opening $l$ to be provided therein at this apex of the triangle. The curved edge P of the sector H is a circular arc whose center is the intersection of the base A and slope C of the inclined plane. Its radial distance from the center of curvature is preferably somewhat greater than the length of the slope C of the basic inclined plane. It is provided on the line of the side A with a pin $m$ threaded for a thumb nut M. The frame member K comprises the rack D which is firmly secured in spaced relation to a bar U that is swingingly connected to the sector member H by a pivot bolt $o$ passing through the opening $l$ in the sector and through a corresponding pivot opening L' in said bar. As a simple and convenient means for connecting the rack D and frame bar U in spaced relation, I prefer to employ cylindrical filling blocks or thimbles $n$ which are interposed between the ends N and N', respectively, of the said rack and bar. Screws or rivets $t$ which pass through the spacing blocks $n$ and the parts separated thereby serve rigidly to attach these members to each other. By thus spacing the rack D from the bar U of the frame there is formed a slot V of width sufficient to allow the sector member H to pass snugly between the bar and the rack D on the opposite side of the frame.

The bar member U is provided at the end opposite the pivot bolt $o$ with an arcuate limb R whose center is the pivotal axis of the sector H. This limb, which is provided with a circular slot $r$ through which the threaded pin $m$ projects and in which it may travel, preferably extends outwardly from the bar U a sufficient distance to subtend at its center of curvature an angle of 45° degrees, sufficient space thereby being provided to enable the limb R to bear a scale of graduations comprehending all possible angular changes of the slope C of the fundamental inclined plane embodied in this sector H.

A consideration of Fig. 23 will enable the manner of placing the scale or graduations upon the limb R to be thoroughly understood. This figure of the drawings diagrammatically illustrates a sector member $H_1$ comprising in a single plane the four separate planes of Fig. 8, their hypotenuses or slopes being extended to the arc to establish new points which mark the successive $\frac{4}{4}$, $\frac{3}{4}$, $\frac{2}{4}$, and $\frac{1}{4}$ ratios of the several planes. These planes carried over to the left on the extended arc show the lines where the edge A of the sector should be positioned to the left of its normal position in order, respectively, to produce these four planes by swinging the sector around its apex or pivotal point $l$. The same procedure is followed for obtaining the metrical graduation of the arcuate limb R as illustrated in Figs. 17 and 22.

Fig. 24 diagrammatically illustrates the metric and inch measures in juxtaposed relation as they may be applied, if desired, to the arcuate limb R of the frame member X. These graduations, as will be apparent from this figure, are obtained in the same manner as has heretofore been explained with reference to Fig. 23, that is to say, the base of the generic triangle has laid out upon it the inch and metric measures and the corresponding graduations upon the arc are obtained by extending straight lines from the apex of the generic inclined plane through the divisions of the base until they intersect the arc. In order to change the direction of the helix and produce screws of a twist contrary to that made by the device illustrated in Figs. 17 to 21, the frame K bearing the graduated scale is reversed in position to receive the reversed sector member. Fig. 22 shows the bar U and graduated limb R reversed to coöperate with a reversed sector. The result of reversing the inclined plane device in respect to changing the direction of the helix is diagrammatically illustrated in Fig. 5.

The modified form of inclined plane device illustrated in Figs. 25, 26 and 27 is especially suitable for the production of screws of very small pitch and of long screws. The principle of operation of the construction illustrated in these figures is precisely the same as that illustrated in the construction shown in Figs. 17 to 21, inclusive. It involves a frame K′ composed of spaced members to which the sector member H′ is pivotally connected in a manner permitting it to pass between them, such pivotal center being located at the apex of the fundamental triangle of the sector, as previously explained. The rack D′ and the bar U′ to which the graduated limb R′ is attached are rigidly united to form the frame K′ by rivets $t'$ in a manner similar to that heretofore described. A convenient way of forming this pivotal connection is to provide the sector H′ with a pivot opening $l'$ at the said apex of the generic triangle and to attach the sector to the frame member K′ by means of a bolt $o'$ passing through corresponding openings in the rack D′ and at the upper end of the bar U′. The means shown for moving the sector H′ with respect to the frame K′ and for retaining the sector in the desired position of adjustment, consists of a threaded rod $m'$, secured to the sector and which bears a nut M′ that is positioned in an opening $k'$ formed in the limb R′ adjacent the lower end of the bar U′. The free end of the threaded rod $m'$ passes through suitable openings in the frame K and the nut M′ fits snugly in the opening $k'$. The slope C′ of the sector member of this form of inclined plane device is curvilinear instead of rectilinear, the curvature of the sloping surface conforming to the case illustrated in the diagram Fig. 4. The lower portion or edge of the face A′ of the sector lies on a line passing through the pivotal center of the sector, as indicated by the dotted line of Fig. 27, the position of this edge of the sector with respect to the graduations borne by the limb R′ thereby serving, as heretofore explained, to enable the operator to read directly from the scale the pitch of the screw produced by any adjustment of the device. The graduations upon the limb R′ are laid out upon the same principle as those borne by the inclined plane device already described. In the present instance, however, the base of the generic triangle is made ten meters instead of one meter long, and one meter of the height of the right triangle is divided into ten equal parts, the result being that the corresponding graduations of the scale which are established by straight lines drawn from the apex of the triangle through these points of subdivision determine in centimeters the pitch of the helix that will be produced when the sector member H′ is adjusted in accordance with those graduations. This construction affords graduations for centering readings which are comparatively widely spaced, thus readily allowing the scale to be further subdivided into millimeters or finer subdivisions if desired.

As shown in the drawings, the inclined plane device may have its tool carrier controlling slope of either rectilinear or curvilinear form, and hence the term inclined plane device employed in the claims is to be understood in a generic sense.

I claim:—

1. In mechanism for cutting or tracing screw threads, the combination with means for rotating a blank upon which the threads are to be inscribed, of a tool carrier, an inclined plane device affording an incline for governing the movement of the tool carrier, and means for displacing said inclined plane device at each rotation of said blank a distance equal to a predetermined definite multiple of an aliquot part of a recognized standard unit of measure.

2. In mechanism for cutting or tracing screw threads, the combination with means for rotating a blank upon which the threads are to be inscribed, of a tool carrier, an inclined plane device affording an incline for governing the movement of the tool carrier and being provided with a series of graduations corresponding to aliquot parts of the base of a forty-five degree right triangle, and means for actuating said inclined plane device upon the rotation of said blank.

3. In mechanism for cutting or tracing screw threads, the combination with means for rotating a blank upon which the threads are to be inscribed, of a tool carrier, an inclined plane device for governing the movement of the tool carrier, and means including a pinion revoluble with said blank rotating means for causing at each rotation of said blank a displacement of said inclined plane device equal to a predetermined definite multiple of an aliquot part of a recognized standard unit of linear measure.

4. In mechanism for cutting or tracing screw threads, the combination with means for moving a blank upon which the threads are to be inscribed, of a tool carrier, an inclined plane device affording an incline for governing the tool carrier, said inclined plane device being provided with a series of unequally spaced graduations determining aliquot parts of a unit of linear measure.

5. In mechanism for cutting or tracing screw threads, an inclined plane device for governing the movement of a tool carrier, said device involving a rack, a member having a sloping face extending at an angle to said rack and pivotally movable with respect thereto about a center corresponding to the intersection of the direction of said slope with a line parallel to said rack, means for securing said rack and pivotally movable member in adjusted position, and a scale member rigidly secured to said rack and provided with a series of graduations spaced to correspond to aliquot parts of a unit of linear measure as applied in a straight line perpendicular to the direction of length of said rack.

6. In mechanism for cutting or tracing screw threads, an inclined plane device for governing the movement of a tool carrier, said device involving a rack, a member pivotally connected to said rack and having a curved sloping face extending at an angle thereto, and means for securing said rack and pivotally connected member in adjusted position, one of said members being provided with a series of graduations spaced to correspond to aliquot parts of a unit of linear measure as applied in a straight line erected perpendicular to the direction of length of the said rack.

7. In mechanism for cutting or tracing screw threads, an inclined plane device for governing the movement of a tool carrier, said device involving pivotally connected members one of which has a face sloping with respect to the direction of movement of said device, and means for securing said members in adjusted position, one of said members being provided with a series of graduations spaced to correspond to aliquot parts of a unit of linear measure as applied in a straight line erected perpendicular to the direction of movement of said inclined plane device.

8. In mechanism for cutting or tracing screw threads, an inclined plane device for governing the movement of a tool carrier, said device involving a rack, a scale bearing member, means for rigidly securing said members in spaced relation, and a sector member pivotally movable with respect to said rack and scale members and adapted to move between the same, said scale member being provided with a series of graduations spaced to correspond to aliquot parts of a unit of linear measure as applied in a straight line perpendicular to the direction of length of said rack.

9. In mechanism for cutting or tracing screw threads, the combination with means for rotating a blank upon which the threads are to be inscribed, of a tool carrier, an inclined plane device affording an incline for governing the movement of the tool carrier, means for causing a displacement of said inclined plane device upon the rotation of said blank, and means for counterbalancing the inclined plane device.

10. The method of graduating a scale for determining the pitch of a helix traced upon a revolving blank by a tool whose movement is governed by an inclined plane device, said method involving dividing into aliquot parts the base of a forty five degree right triangle, said base being a recognized standard unit of measure, and establishing graduations on right lines passing through the apex of said triangle opposite said divided base and through the said points of division of the base.

In testimony whereof I affix my signature.

EDMUND BECKER.